US008716601B2

(12) United States Patent
Xu et al.

(10) Patent No.: US 8,716,601 B2
(45) Date of Patent: May 6, 2014

(54) CORONA RESISTANT HIGH VOLTAGE BUSHING ASSEMBLY

(75) Inventors: James Jun Xu, Niskayuna, NY (US); Lin Zhang, Shanghai (CN); Rolando Luis Martinez, Clifton Park, NY (US); Venkata Subramanya Sarma Devarakonda, Karnataka (IN)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 13/368,777

(22) Filed: Feb. 8, 2012

(65) Prior Publication Data

US 2013/0199837 A1 Aug. 8, 2013

(51) Int. Cl.
*H01B 17/26* (2006.01)
*H02G 3/18* (2006.01)

(52) U.S. Cl.
USPC ... 174/142; 174/144; 174/152 R; 174/11 BH; 174/650; 16/2.1

(58) Field of Classification Search
USPC ..... 174/140 R, 142, 144, 650, 152 R, 11 BH, 174/14 BH, 31 R, 137 R, 141 C; 16/2.1, 2.2
See application file for complete search history.

(56) References Cited

U.S. PATENT DOCUMENTS 3,055,968 A * 9/1962 Spiece ........................ 174/31 R
3,791,859 A * 2/1974 Hirayama ................. 174/140 C
3,819,851 A * 6/1974 Nigol ........................ 174/140 C
3,888,796 A 6/1975 Nigol
3,982,048 A * 9/1976 Zlupko ..................... 174/140 C
4,232,185 A 11/1980 Higuchi et al.
4,237,415 A * 12/1980 Easley ..................... 174/11 BH
4,447,492 A 5/1984 McKaveney
4,465,900 A * 8/1984 Mitsumatsu et al. ..... 174/140 C
4,524,404 A 6/1985 Verma
4,540,848 A 9/1985 Beijar et al.
4,584,429 A * 4/1986 Raketti et al. ................ 174/142
4,760,216 A 7/1988 Thiel et al.
5,200,578 A 4/1993 Brucker
5,483,023 A 1/1996 Barnes
6,162,752 A 12/2000 Kawamoto et al.
6,340,497 B2 1/2002 Wilson et al.
6,346,677 B1 2/2002 Guillemette et al.
6,475,941 B1 11/2002 Liebermann
6,515,232 B2 * 2/2003 Forster ...................... 174/152 R
6,864,432 B2 3/2005 Boettcher et al.
6,951,987 B1 10/2005 Hansen et al.
7,262,143 B2 8/2007 Imai et al.
7,262,367 B2 8/2007 Donzel et al.
7,742,676 B2 6/2010 Tilliette et al.
8,222,526 B2 * 7/2012 Bresney et al. ........... 174/152 R
8,492,656 B2 * 7/2013 Martinez et al. .......... 174/152 R

* cited by examiner

*Primary Examiner* — Angel R Estrada
(74) *Attorney, Agent, or Firm* — Cantor Colburn LLP

(57) ABSTRACT

A corona resistant high voltage bushing assembly includes an insulating sleeve to surround a conductor, a flange located on an outside surface of the insulating sleeve, and a first band of semiconductive glaze located on the outer surface of the insulating sleeve spaced apart from an end of the insulating sleeve.

20 Claims, 5 Drawing Sheets

CORONA RESISTANT HIGH VOLTAGE BUSHING ASSEMBLY

BACKGROUND OF THE INVENTION

The subject matter disclosed herein relates to high voltage bushing assemblies, and more specifically, to corona resistant high voltage bushing assemblies applied to a hydrogen-cooled large turbo generator.

When power is provided to a device or structure, a bushing assembly may be used to help isolate the power line from the building or structure. For example, bushings are used to provide high voltages to turbines. Bushings include a conductor, an insulating sleeve around the conductor, and a device to affix the insulating sleeve to the building or structure. The conductor passes through the insulating sleeve and into the building or structure.

BRIEF DESCRIPTION OF THE INVENTION

According to one aspect of the invention, a bushing assembly comprises an insulating sleeve to surround a conductor; a flange located on an outside surface of the insulating sleeve; and a first band of semiconductive glaze located on the outer surface of the insulating sleeve spaced apart from a first end of the insulating sleeve, the first band of semiconductive glaze including a plurality of sub-bands having different resistivities.

According to another aspect of the invention, a high-voltage bushing system comprises a bushing having an insulating sleeve to surround a conductor and a flange on an outside surface of the insulating sleeve to mount the bushing to a structure, the outside surface of the insulating sleeve having at least one band of semiconductive glaze spaced apart from an end of the insulating sleeve, the at least one band of semiconductive glaze including a plurality of sub-bands having different resistivities; and a current transformer spaced apart from the bushing to monitor a current of the conductor.

According to yet another aspect of the invention, a high-voltage bushing assembly comprises an insulating sleeve to surround a conductor; at least one band of semiconductive glaze on a surface of the insulating sleeve, the at least one band including a plurality of sub-bands having different resistivities; and non-semiconductive glaze on portions of the surface of the insulating sleeve that do not include the at least one band of semiconductive glaze.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
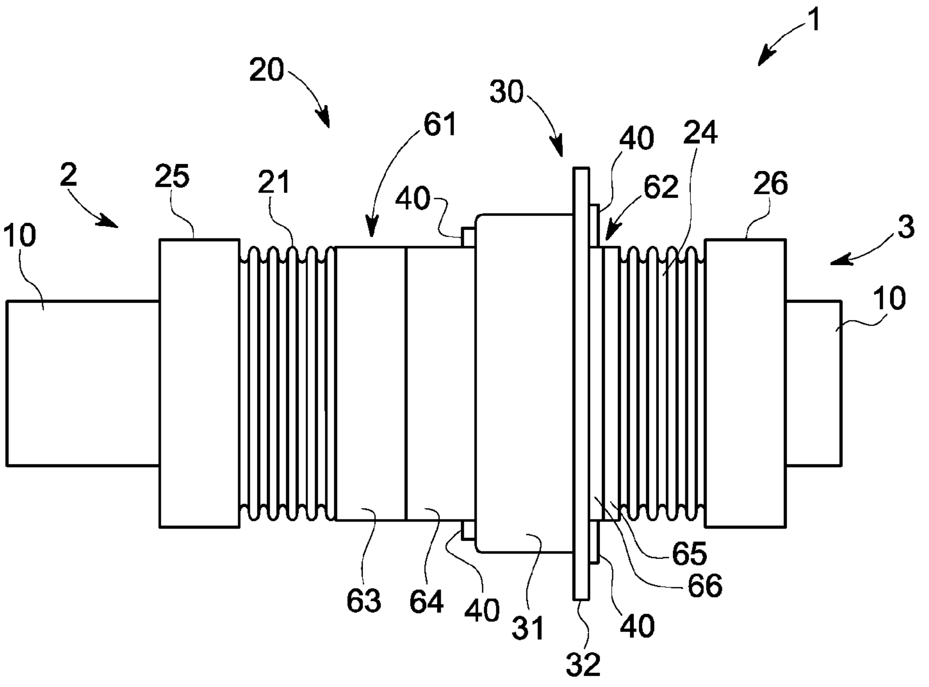
FIG. 1 illustrates a bushing according to an embodiment of the invention.

FIG. 1 illustrates a bushing 1 having a first end 2 and a second end 3 according to an embodiment of the present invention. The bushing 1 includes an insulating sleeve 20 surrounding a conductor 10. In one embodiment, the insulating sleeve 20 is made of porcelain. For example, the insulating sleeve 20 may be made of high performance C-120/C-130 alumina porcelain. A flange 30 surrounds the insulating sleeve 20. In one embodiment, the flange 30, which is made of a non-magnetic material such as stainless steel, is mounted to a fixed surface, so that one end of the bushing 1 is located on one side of the surface and the other end of the bushing 1 is located on the other side of the fixed surface. For example, the fixed surface may be the shell of a turbine. In such a case, the first end 2 of the bushing is located outside the shell of the turbine (air side) and the second end 3 of the bushing is located inside the shell of the turbine, or more specifically, of a generator stator frame assembly (hydrogen side).

At the first end 2 of the bushing 1, between an exposed portion of the conductor 10 and the flange 30, are a first set of annular ribs or ridges 21 and a first band of semiconductive glaze 61 (or first semiconductive-glazed band). A non-semiconductive-glazed portion 25 is located between the exposed portion of the conductor 10 and the ridges 21. At the second end 3 of the bushing 1, are a second set of annular ribs or ridges 24 and a second band of semiconductive glaze 62 (or second semiconductive-glazed band). A non-semiconductor-glazed portion 26 is located between the second set of ridges 24 and an exposed portion of the conductor 10. Throughout the specification and claims, the portions 21 and 24 are described as ribs, ridges, sets of ribs/ridges, ribbed/ridged portions, annular ribs/ridges, and the like.

The first semiconductive-glazed band 61 includes a plurality of sub-bands having different resistivities. The plurality of sub-bands is arranged to form a resistivity gradient from the non-semiconductive-glazed portion 25 to the first sub-band 63 to the second sub-band 64. In other words, the non-semiconductive-glazed portion 25 has a resistivity greater than each of the sub-bands 63 and 64 of the first semiconductive-glazed portion 61, and the first sub-band 63 has a resistivity greater than the second sub-band 64.

Similarly, the second semiconductive-glazed band 62 includes a plurality of sub-bands having different resistivities. The plurality of sub-bands is arranged to form a resistivity gradient from the non-semiconductive-glazed portion 26 to the third sub-band 65 to the fourth sub-band 66. In other words, the non-semiconductive glazed portion 26 has a resistivity greater than each of the sub-bands 65 and 66 of the second semiconductive-glazed band 62, and the third sub-band 65 has a resistivity greater than the fourth sub-band 66.

Although FIG. 1 illustrates only two sub-bands in each of the first and second bands of semiconductive glaze 61 and 62, according to alternative embodiments, numbers of sub-bands greater that two may be used. For example, in one embodiment, the first or second semiconductive-glazed bands 61 or 62 includes three or more sub-bands having different resistivities. The three or more sub-bands are arranged to form a resistivity gradient from the non-semiconductive-glazed portions 25 and 26, respectively, toward the flange 30.

The flange 30 includes a base portion 31 having a substantially cylindrical or conic shape, and an extended portion 32 extending from the base portion 31. In one embodiment, the extended portion has a substantially disk-like shape. In some embodiments, the flange 30 includes additional features, such as supporting braces and holes for mounting or fixing the flange 30 to a surface. In another embodiment, the base portion 31 of the flange 30 is parallel to the surface of the insulating sleeve 20. For example, each of the outer surface of the insulating sleeve 20 and the base portion 31 of the flange 30 may be cylindrically or conically shaped, and the base portion 31 of the flange 30 may extend along a portion of the outer surface of the insulating sleeve 20 and surround the insulating sleeve 20.

The first and second bands of semiconductive glaze 61 and 62 are portions of the bushing 1 in which semiconductive materials are incorporated into a glaze that makes up an outer layer of the insulating sleeve 20. In some embodiments, the portions of the bushing 1 that do not include the bands of semiconductive glaze 61 and 62, such as the ridged portions 21 and 24 and the portions 25 and 26, are glazed with a non-semiconductive glaze. Applying a semiconductive glaze to the insulating sleeve 20 bonds the semiconductive material to the insulating sleeve 20 stronger than if applied as a layer by other means, such as by chemically depositing or coating semiconductive materials on a pre-glazed surface or a non-glazed surface without fixing the material to the surface by glazing. In some embodiments, a semiconductor glaze can be formed in a porcelain making furnace whose firing temperature can be as high as 1200 degrees Celsius.

The semiconductive-glazed bands 61 and 62 are located on either side of the flange 30. In one embodiment, the semiconductive-glazed bands 61 and 62 are located immediately adjacent to the flange 30. In other words, in one embodiment, no non-semiconductive-glazed portion is located between the flange 30 and the semiconductive-glazed bands 61 and 62. By locating the semiconductive-glazed bands 61 and 62 adjacent to the flange 30, the corona and flashover resistance of the bushing 1 is substantially increased.

In the embodiment illustrated in FIG. 1, the first and second semiconductive-glazed bands 61 and 62 are located between ribs 21 and 24 and the flange 30, respectively. However, in alternative embodiments, portions of the ribs 21 and/or 24 are also glazed with the semiconductive glaze. In yet other embodiments, portions of the outer surface of the insulating sleeve beneath the flange 30 are glazed with a semiconductive glaze.

The semiconductive-glazed bands 61 and 62 are bands that circumscribe the insulating sleeve 20. The glazed portions of the insulating sleeve 20 on either side of the semiconductive-glazed bands 61 and 62 include a normal glaze that does not include semiconductive materials. The normal glaze has a relatively high surface resistivity, such a surface resistivity in the range from $10^{12}$-$10^{14}$ ohms/square ("ohms/sq"). According to one embodiment, the surface resistivity of the first and third sub-bands 63 and 65 is in a range from $10^{8}$-$10^{9}$ ohms/sq, and the surface resistivity of the second and fourth sub-bands 64 and 66 is in a range from $10^{6}$-$10^{7}$ ohms/sq. In one embodiment, each sub-band 63, 64, 65, and 66 is homogeneous, or comprising each only one band having one resistivity rather than multiple bands having different resistivities.

According to one embodiment, the semiconductive glaze increases the porcelain surface temperature to several degrees Celsius higher because of the nature of resistivity-based voltage grading, which prevents moisture condensation and ambient pollution deposits, which further improves corona resistance of the bushing 1.

In some embodiments, the semiconductive glaze is made with voltage-grading materials having a surface resistivity that decreases with increased electric fields or temperatures. An example of the voltage-grading materials includes iron-titanium oxide. Other examples include tin oxide, silicon carbide, silicon nitride, aluminum nitride, boron nitride, boron oxide, molybdenum oxide, molybdenum disulfide, $Ba_2O_3$, and aluminum carbide. In one embodiment, the linear thermal expansion of the semiconductive glaze is smaller than that of the base material, such as porcelain, of the insulating sleeve 20.

In one embodiment of the present invention, electrically conductive adhesive 40 is applied at both ends of the flange 30 adjacent to the bands of semiconductive glaze 61 and 62. The electrically conductive adhesive 40 electrically connects the flange 30 to the bands of semiconductive glaze 61 and 62.

Figure 2:
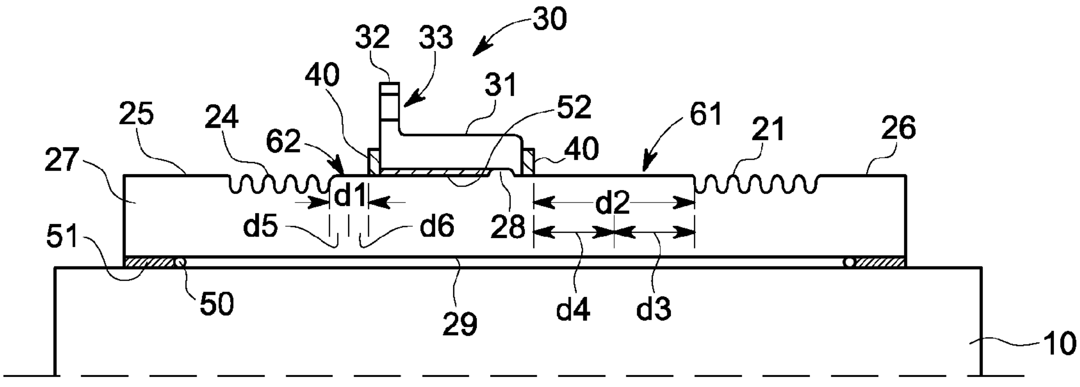
FIG. 2 illustrates a cross-section of a bushing according to an embodiment of the invention.

FIG. 2 illustrates a cross-section of a half of the bushing 1. The insulating sleeve 20 of the bushing 1 includes a substrate or main portion 27 made of an insulating material, such as porcelain. Annular rings 50 are located within the substrate 27 to mount the conductor 10 within the insulating sleeve 20. According to various embodiments, the annular rings 50 may either be part of the substrate 27 or may be independent structures that are inserted into a cavity in the substrate 27. In one embodiment, the annular rings are made of a conductive material, such as metal, and more specifically, a stainless steel spring. A spacer 51 is also provided at the ends of the insulating sleeve 20.

The flange 30 is mounted to the substrate 27 by a highly thermally-insulating (high thermal rating) epoxy-glass bonding material 52. In one embodiment, the substrate 27 includes a protrusion 28 that abuts a ridge of the flange 30 to hold a position of the flange 30 with respect to the substrate 27. The thermally-insulating epoxy 52 fills a space between the substrate 27 and the base portion 31 of the flange 30 corresponding to the height of the protrusion 28. The flange 30 further includes at least six holes 33 to mount the bushing 1 to a surface.

The bands of semiconductive glaze have lengths of d2 and d1, respectively. In one embodiment, the combined length d1+d2 is less than or equal to 12 inches long. For example, in one embodiment the first band of semiconductive glaze 61 is 5.5 inches long, and the second band of semiconductive glaze is 3.5 inches long. The first sub-band and second sub-band have lengths of d3 and d4, respectively. The third sub-band 65 and fourth sub-band 66 have lengths of d5 and d6, respectively. According to one embodiment, a length d3 of the first sub-band 63 is greater than a length d4 of the second sub-band 64, and a length d5 of the third sub-band 65 is greater than the length d6 of the fourth sub-band 66. It is known to those skilled in the art that the semiconductive band length or width may have a process specification limit or tolerance for the porcelain-making process. However, the specification limit and tolerance are affordable and different semiconductive bands exist to further lower the electric field from triggering corona discharge.

According to one embodiment, an inner surface or wall 29 of the substrate 27 is glazed with a semiconductive glaze. The semiconductive glaze of the inner surface 29 has a surface resistivity that is equal to or less than the surface resistivity of the second and fourth sub-bands 64 and 66. For example, while the surface resistivity of the second and fourth sub-bands 64 and 66 is in a range between $10^{6}$-$10^{7}$ ohms/sq, a surface resistivity of the semiconductive glaze of the inner surface 29 may be in a range between $10^{5}$-$10^{7}$ ohms/sq. The non-conducting glaze, or each glazed portion of the insulating sleeve 20 that does not include the semiconductive glaze, including the portions 25 and 26, and the ribbed portions 21 and 24, may have a surface resistivity in a range between $10^{12}$-$10^{14}$ ohms/sq.

Figure 3:
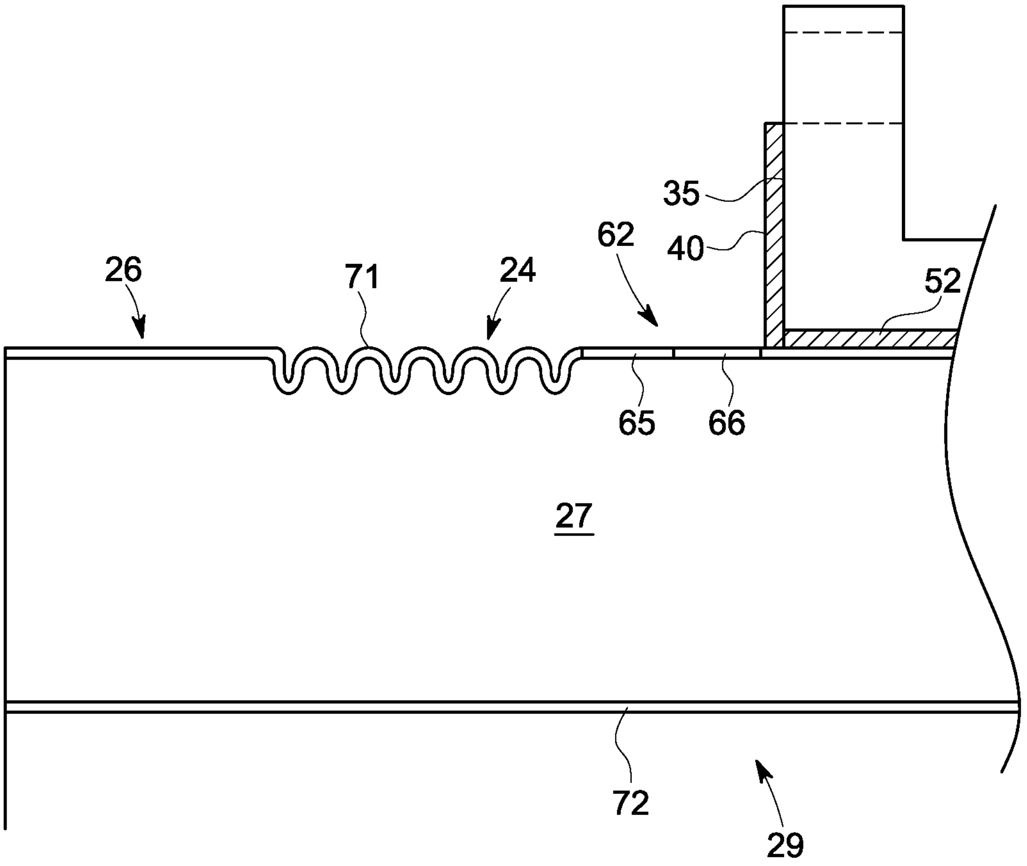
FIG. 3 illustrates a cross-section of a portion of the bushing according to an embodiment of the invention.

FIG. 3 illustrates a magnified portion of a portion of the bushing 1. The substrate 27 of the insulating sleeve 20 has glazed portions corresponding to a portion of the outer surface of the insulating sleeve 20 having annular ridges 24, a portion of the outer surface having no annular ridges 26, the inner surface 29 of the insulating sleeve 20, and the second band of insulating glaze 62. The second band of semiconductive glaze 62 includes the third and fourth sub-bands 65 and 66. The glaze 71 covers an outer surface of the annular ridges 24 and the portion 26 having no annular ridges. The glaze 71 is a non-semiconductive glaze. The glaze 72 covers the inner surface or wall 29 of the insulating sleeve 20. In one embodiment, a thickness of the glaze 71, 72, 65, or 66 is 1/20 to 1/40 the thickness of the substrate 27.

An electrically conductive adhesive 40 is coated on an end surface 35 of the flange 30. The electrically conductive adhesive 40 having a surface resistivity as low as $4\times10^{-3}$ ohms/sq, electrically connects the flange to the second sub-band 66. In one embodiment, the adhesive is a silicone or epoxy-based matrix filled with carbon black or for more endurance, filled with silver particles to achieve the performance required.

Table 1 illustrates a comparison of electric field distribution on an outer surface of a bushing having a semiconductive-glazed band and a bushing having no semiconductive-glazed band.

The values of Table 1 correspond to a bushing attached to a structure filled with hydrogen ($H_2$), such as a turbo generator, so that the part of the bushing on one side of the flange is exposed to air and the part of the bushing on the other side of the flange is exposed to the hydrogen. The values of Table 1 correspond to the side exposed to the hydrogen and tested at rated voltage of 24 kV.

TABLE 1

| | Electric field on outer porcelain surface (H2 side) kV/in Testing voltage | |
|---|---|---|
| | 14.6 kV | 68 kV |
| No semiconductive-glaze ($10^{12}$-$10^{14}$ ohms-inch) | 51 | 239 |
| Example 1: 2 sub-band semiconductive-glazed band ($1\times10^7$ ohms-inch and $5\times10^8$ ohms-inch) | 9.5 | 44 |
| Example 2 2 sub-band semiconductive-glazed band ($1\times10^7$ ohms-inch and $1\times10^9$ ohms-inch) | 5.7 | 28 |

In the examples illustrated in Table 1, a voltage provided to the conductor 10 of 14.6 kV corresponds to testing voltage which is of 1.05× maximal rated voltage of 24 kV/1.732 per IEC 60137 requirements, and the voltage of 68 kV corresponds to a Hipot testing voltage that simulates potential spike that may occur during operation, which is about three times the rated voltage of the bushing In each example corresponding to embodiments of the present invention in which the bushing 1 includes the sub-bands 65 and 66 having different resistivities to form a resistivity gradient from the non-semiconductive glaze portion 26 toward the flange 30, the electric field generated on the outer surface of the bushing 1 is substantially less than when a non-semiconductive glaze is used, thereby reducing significantly the tendency of flashover and coronal discharge having an inception (triggering) strength of approximately 75 kV/inch Table 2 illustrates a comparison of electric field distribution on an outer surface of a bushing having a semiconductive-glazed band and a bushing having no semiconductive-glazed band.

The values of Table 2 correspond to a bushing attached to a structure filled with hydrogen ($H_2$), such as a turbine, so that the part of the bushing on one side of the flange is exposed to air and the part of the bushing on the other side of the flange is exposed to the hydrogen. The values of Table 2 correspond to the side exposed to the air.

TABLE 2

| | Electric field on outer porcelain surface (air side) kV/in Testing Voltage | |
|---|---|---|
| | 14.6 kV | 68 kV |
| No semiconductive-glaze ($10^{12}$-$10^{14}$ ohms-inch) | 85 | 368 |
| Example 1: 2 sub-band semiconductive-glazed band ($1\times10^7$ ohms-inch and $5\times10^8$ ohms-inch) | 12 | 56 |
| Example 2 2 sub-band semiconductive-glazed band ($1\times10^7$ ohms-inch and $1\times10^9$ ohms-inch) | 5.6 | 27 |

In the examples illustrated in Table 2, the voltage provided to the conductor 10 of 14.6 kV corresponds to a testing voltage, which is of 1.05× maximal rated voltage of 24 kV/1.732 per IEC 60137 requirements, and the voltage of 68 kV corresponds to a Hipot testing voltage that simulates potential spike that may occur during operation, which is about three times the rated voltage of the bushing. In each example corresponding to embodiments of the present invention in which the bushing 1 includes the sub-bands 63 and 64 having different resistivities to form a resistivity gradient from the non-semiconductive glaze portion 25 toward the flange 30, the electric field generated on the outer surface of the bushing 1 is substantially less than when a non-semiconductive glaze is used, thereby reducing substantially the tendency of flashover and coronal discharge on the air side Without voltage grading of the above-described embodiments, the non-semiconductive glazed bushing would have a high potential to trigger corona discharge as it has electric field more than the corona inception field strength of 75 kV/inch.

Figure 4:
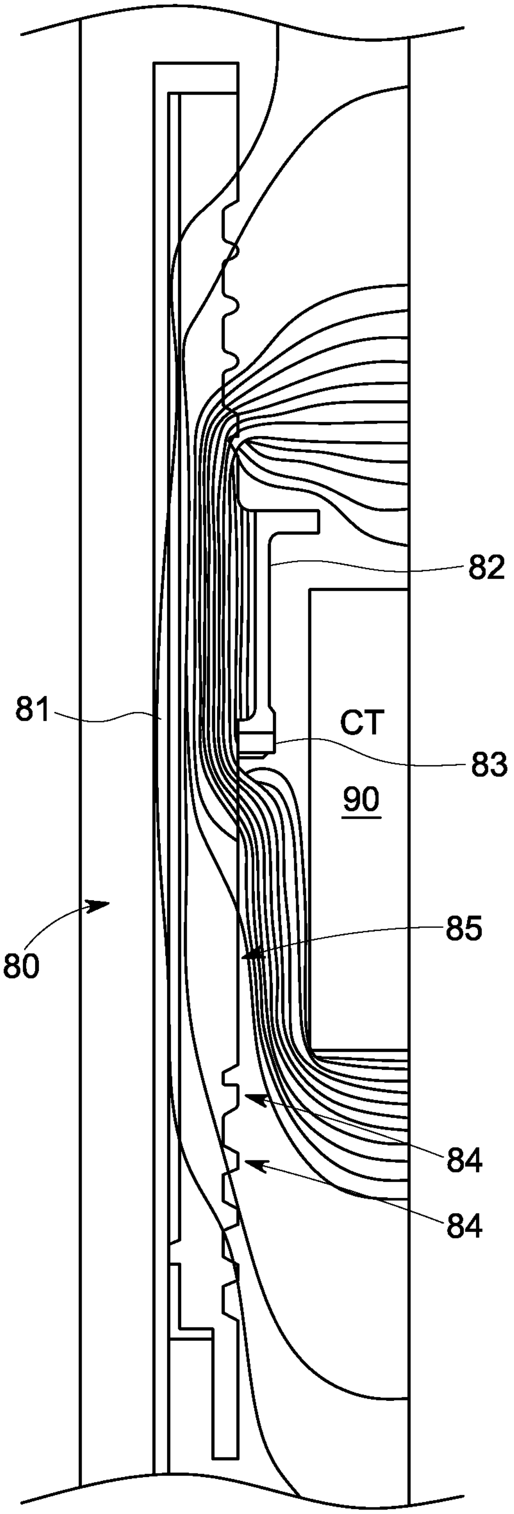
FIGS. 4 and 5 illustrate electric fields generated by current flowing in a conductor of a bushing.

FIG. 4 illustrates an electrical field, represented by dashed lines, that is generated when a current flows through a conductor 81 of the bushing 80. A current transformer 90 is positioned apart from the bushing 80. In one embodiment, the current transformer 90 monitors a current-flow, which can be as high as 25,000 amps, through the conductor 81 of the bushing 80. In the embodiment illustrated in FIG. 4, no semiconductive glaze is provided on the portion 85 of the outer surface of the bushing 80 between a flange 82 and annular ridges 84. Consequently, the electrical field generated when current flows through the conductor 81 extends upward to the current transformer 90 at an end 83 of a flange 82. This may result in the electrical field interfering with the operation of the current transformer 90, and in an inaccurate current measured by the current transformer 90.

Figure 5:
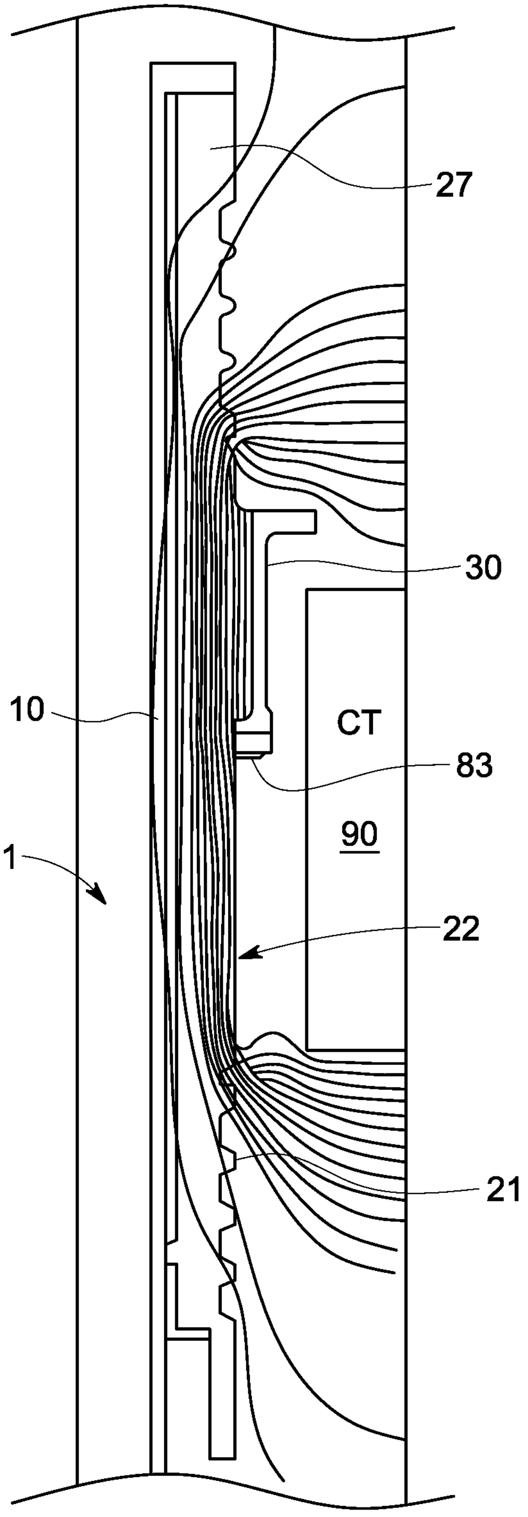

In contrast, the utility of this a bushing design according to the above-described embodiments is illustrated in FIG. 5. The bushing 1 includes the first band of semiconductive glaze 61 including the first and second sub-bands 63 and 64 between the flange 30 and the annular ridges 21. When a current flows through the conductor 10, an electrical field, represented by dashed lines, does not extend away from the bushing 1 immediately adjacent to the flange 30. Instead, the electrical field extends within the substrate 27 along the portion of the substrate corresponding to the first band of semiconductive glaze 61 and extends away from the bushing 1 only at the end of the first band of semiconductive glaze 61. In other word, the electric field is deflected away from the current transformer. Consequently, the electrical field does not interfere with the current transformer 90.

Figure 6:
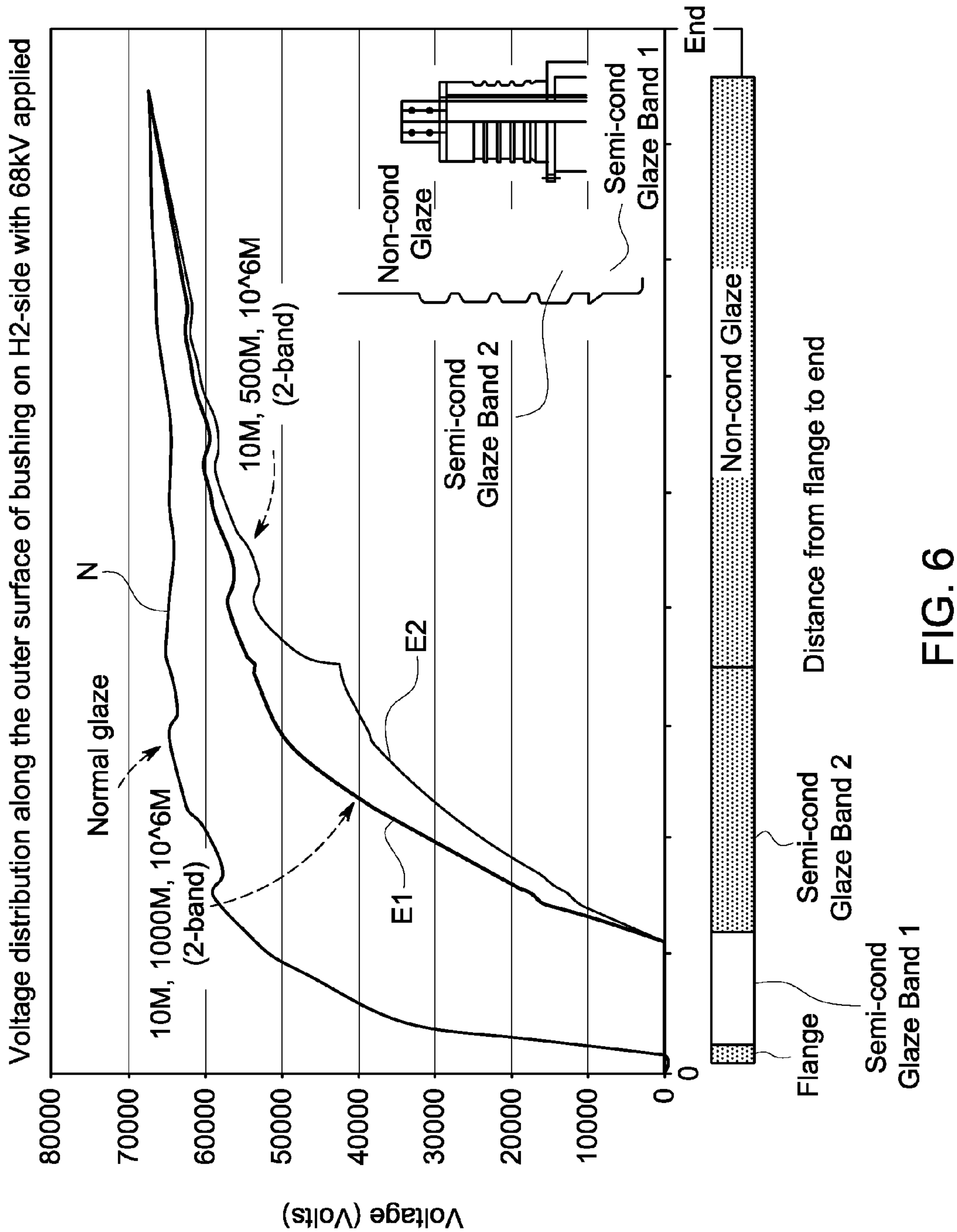
FIG. 6 is a graph illustrating a voltage distribution on a surface of a bushing.

FIG. 6 is a graph of a voltage distribution along an outer surface of a bushing 1 on the side of the flange 30 having the second band of semiconductive glaze 62, the second set of ridges 24, and the non-conductive glazed portion 26. Line N represents the bushing having a normal glaze, or a non-semiconductive glaze. Lines E1 and E2 represent examples in which the third and fourth sub-bands 65 and 66 have surface resistivities of $1\times10^{7}$ ohms/sq (third sub-band 65), $1\times10^{9}$ ohms/sq (fourth sub-band 66, E1), and $5\times10^{8}$ ohms/sq (fourth sub-band 66, E2). As illustrated in FIG. 6, the voltage along the outer surface of the bushing 1 along the fourth sub-band 66 is graded to almost zero volts, and the voltage increases along a portion of the outer surface of the bushing 1 corresponding to the third sub-band 65. However, as indicated by the slope of the lines E1 and E2, the rate at which the voltage increases along the portion of the outer surface of the bushing 1 corresponding to the third sub-band 65 is less than the rate at which the voltage increases when no semiconductive glaze is applied.

According to the above embodiments, a bushing has substantially improved resistance to corona discharges and flashovers by glazing the bushing with a semiconductive glaze. The outer surface of the bushing includes bands of semiconductive glaze on either side of a flange, the bands including sub-bands having different resistivities to form a resistivity gradient. The inner surface of the bushing includes a semiconductor glaze having a resistivity different from that of at least one of the bands of the outer surface of the bushing. An electrically conductive adhesive is coated on ends of the flange to electrically connect the flange to the semiconductive-glazed bands.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A corona resistant high voltage bushing assembly, comprising:

an insulating sleeve to surround a conductor, the insulating sleeve comprised of high strength alumina porcelain;

a flange located on an outside surface of the insulating sleeve; and a first band of semiconductive glaze located on the outside surface of the insulating sleeve spaced apart from a first end of the insulating sleeve, the first band including a first plurality of sub-bands of semiconductive glaze having different resistivities.

2. The corona resistant high voltage bushing assembly of claim 1, wherein the first band of semiconductive glaze is located between the flange and the first end of the insulating sleeve.

3. The corona resistant high voltage bushing assembly of claim 1, wherein a first one of the first plurality of sub-bands has a resistivity between $10^{8}$-$10^{9}$ ohms/sq and a second one of the first plurality of sub-bands has a resistivity between $10^{6}$-$10^{7}$ ohms/sq.

4. The corona resistant high voltage bushing assembly of claim 3, wherein the second one of the first plurality of sub-bands is located between the first one of the first plurality of sub-bands and the flange.

5. The corona resistant high voltage bushing assembly of claim 1, wherein a number of the first plurality of sub-bands is two.

6. The corona resistant high voltage bushing assembly of claim 1, wherein a resistivity of the first plurality of sub-bands increases in a direction from the flange to an end of the insulating sleeve.

7. The corona resistant high voltage bushing assembly of claim 1, further comprising a second band of semiconductive glaze on the outside surface of the insulating sleeve on an opposite side of the flange from the first band of semiconductive glaze.

8. The corona resistant high voltage bushing assembly of claim 7, wherein the second band of semiconductive glaze includes a second plurality of sub-bands of semiconductive glaze having different resistivities.

9. The corona resistant high voltage bushing assembly of claim 8, wherein a first one of the second plurality of sub-bands has a resistivity between $10^{8}$-$10^{9}$ ohms/sq and a second one of the second plurality of sub-bands has a resistivity between $10^{6}$-$10^{7}$ ohms/sq.

10. The corona resistant high voltage bushing assembly of claim 1, wherein the insulating sleeve includes inner walls to define an opening to receive the conductor, and the bushing assembly further comprises a third band of semiconductive glaze on the inner walls.

11. The corona resistant high voltage bushing assembly of claim 10, wherein the third band of semiconductive glaze extends from the first end of the insulating sleeve to the second end of the insulating sleeve.

12. The corona resistant high voltage bushing assembly of claim 10, wherein the third band of semiconductive glaze has a resistivity between $10^{5}$-$10^{7}$ ohms/sq.

13. The corona resistant high voltage bushing assembly of claim 1, further comprising an electrically conductive adhesive connecting the flange to the first band of semiconductive glaze.

14. The corona resistant high voltage bushing assembly of claim 1, further comprising a non-semiconductive glazed portion between the first band of semiconductive glaze and the first end of the insulating sleeve.

15. The corona resistant high voltage bushing assembly of claim 14, further comprising annular ridges located in the non-semiconductive glazed portion.

16. The bushing assembly of claim 1, further comprising a highly thermally-insulating epoxy having a thermal rating of class 155 between the flange and the insulating sleeve.

17. A corona resistant high voltage bushing system, comprising:

a bushing having an insulating sleeve to surround a high current conductor and a non-magnetic flange on an outside surface of the insulating sleeve to mount the bushing to a structure, the outside surface of the insulating sleeve having at least one band of semiconductive glaze spaced apart from an end of the insulating sleeve, the at least one band of semiconductive glaze having a plurality of sub-bands of semiconductive glaze having different resistivities; and a current transformer spaced apart from the bushing to monitor a current of the conductor.

18. The corona resistant high-voltage bushing system of claim 17, further comprising a band of non-semiconductive glaze located between the at least one band of semiconductive glaze and the end of the insulating sleeve.

19. The corona resistant high-voltage bushing system of claim 17, wherein an end of the band of semiconductive glaze extends past an end of the current transformer with respect to the end of the insulating sleeve.

20. A corona resistant high-voltage bushing assembly, comprising:

an insulating sleeve to surround a conductor;

at least one band of semiconductive glaze on a surface of the insulating sleeve, the at least one band of semiconductive glaze including a plurality of sub-bands of semiconductive glaze having different resistivities; and non-semiconductive glaze on portions of the surface of the insulating sleeve that do not include the at least one band of semiconductive glaze.

* * * * *